(12) United States Patent
Zimmer et al.

(10) Patent No.: US 7,840,398 B2
(45) Date of Patent: Nov. 23, 2010

(54) TECHNIQUES FOR UNIFIED MANAGEMENT COMMUNICATION FOR VIRTUALIZATION SYSTEMS

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 962 days.

(21) Appl. No.: 11/390,687

(22) Filed: Mar. 28, 2006

(65) Prior Publication Data

US 2007/0233455 A1   Oct. 4, 2007

(51) Int. Cl.
G06F 9/455 (2006.01)

(52) U.S. Cl. .............................. 703/23; 703/24; 718/1; 718/104

(58) Field of Classification Search ............. 703/23–27; 711/1, 6, 170, 203; 718/1, 104
See application file for complete search history.

(56) References Cited

U.S. PATENT DOCUMENTS

| | | | | |
|---|---|---|---|---|
| 6,075,938 | A * | 6/2000 | Bugnion et al. ................ 703/27 |
| 6,496,847 | B1 * | 12/2002 | Bugnion et al. ................ 718/1 |
| 7,069,413 | B1 * | 6/2006 | Agesen et al. .............. 711/207 |
| 7,356,679 | B1 * | 4/2008 | Le et al. ........................ 713/1 |
| 7,421,533 | B2 * | 9/2008 | Zimmer et al. ................ 711/6 |
| 7,694,298 | B2 * | 4/2010 | Goud et al. .................... 718/1 |
| 2002/0082824 | A1 * | 6/2002 | Neiger et al. .................. 704/2 |
| 2002/0173863 | A1 * | 11/2002 | Imada et al. .................. 700/83 |
| 2003/0233385 | A1 * | 12/2003 | Srinivasa et al. .............. 709/1 |
| 2004/0010788 | A1 * | 1/2004 | Cota-Robles et al. .......... 718/1 |
| 2004/0054518 | A1 * | 3/2004 | Altman et al. ................ 703/27 |
| 2004/0128670 | A1 * | 7/2004 | Robinson et al. ............... 718/1 |
| 2005/0081212 | A1 * | 4/2005 | Goud et al. .................. 718/107 |
| 2005/0120160 | A1 * | 6/2005 | Plouffe et al. .................. 711/1 |
| 2005/0132367 | A1 * | 6/2005 | Tewari et al. .................. 718/1 |
| 2005/0138370 | A1 * | 6/2005 | Goud et al. .................. 713/164 |
| 2005/0235123 | A1 * | 10/2005 | Zimmer et al. .............. 711/170 |
| 2005/0268071 | A1 * | 12/2005 | Blandy et al. ................ 711/208 |
| 2005/0289218 | A1 * | 12/2005 | Rothman et al. ............ 709/203 |
| 2006/0075076 | A1 * | 4/2006 | Sinha ........................ 709/220 |
| 2006/0123416 | A1 * | 6/2006 | Cibrario Bertolotti et al. .. 718/1 |
| 2006/0143617 | A1 * | 6/2006 | Knauerhase et al. ........ 718/104 |
| 2006/0146057 | A1 * | 7/2006 | Blythe ........................ 345/506 |
| 2006/0155912 | A1 * | 7/2006 | Singh et al. .................... 711/6 |
| 2006/0184349 | A1 * | 8/2006 | Goud et al. .................... 703/24 |
| 2006/0288130 | A1 * | 12/2006 | Madukkarumukumana et al. ............................ 710/22 |
| 2007/0061634 | A1 * | 3/2007 | Marisetty et al. .............. 714/48 |
| 2007/0089111 | A1 * | 4/2007 | Robinson et al. ............... 718/1 |

(Continued)

OTHER PUBLICATIONS

The Xen Team: "Xen Users' Manual, Xen v2.0 for x86", Aug. 9, 2004, pp. 1-50, University of Cambridge, United Kingdom.

(Continued)

*Primary Examiner*—Kamini S Shah
*Assistant Examiner*—Kibrom Gebresilassie
(74) *Attorney, Agent, or Firm*—Kacvinsky Daisak PLLC

(57) ABSTRACT

Techniques for unified management communications for virtual systems are described. An apparatus may comprise a first server emulated using a first virtual machine, a second server emulated using a second virtual machine, and a virtual machine monitor. The virtual machine monitor may communicate information with one or more emulated servers using a Simple Object Access Protocol (SOAP) message. Other embodiments are described and claimed.

20 Claims, 3 Drawing Sheets

U.S. PATENT DOCUMENTS

| | | | |
|---|---|---|---|
| 2007/0136579 A1* | 6/2007 | Levy et al. .................. | 713/168 |
| 2007/0234358 A1* | 10/2007 | Hattori et al. ................. | 718/1 |
| 2008/0005297 A1* | 1/2008 | Kjos et al. .................. | 709/223 |
| 2009/0119684 A1* | 5/2009 | Mahalingam et al. ....... | 719/324 |
| 2009/0210527 A1* | 8/2009 | Kawato ...................... | 709/224 |

OTHER PUBLICATIONS

The Xen Team: "The Xen Virtual Machine Monitor", Aug. 9, 2004, p. 1, Retrieved from the Internet on Mar. 30, 2006: <web.archive.org/web//20041009195748/http://www.cl.cam.ac.uk/Research/SRG/netos/xen/documentation.html>, Verifies the publication date of the "Xen Users' Manual", University of Cambridge, UK.

Barham et al., "Xen and the Art of Virtualization", Proceedings of the ACM Symposium on Operating Systems Principles, ACM, Dec. 2003, pp. 164-177, vol. 37, No. 5.

Jeff Dike, "User Mode Linux HOWTO", Jun. 18, 2002, pp. 1-42.

Jeff Dike, "User-Mode Linux", Proceedings of Annual Linux Showcase and Conference, Nov. 5, 2001, pp. 1-12.

* cited by examiner

TECHNIQUES FOR UNIFIED MANAGEMENT COMMUNICATION FOR VIRTUALIZATION SYSTEMS

CROSS REFERENCE TO RELATED APPLICATION

This application is related to commonly owned U.S. patent application Ser. No. 11/009,891, now U.S. Pat. No. 7,694,298, titled "METHOD AND APPARATUS FOR PROVIDING VIRTUAL SERVER BLADES" and filed on Dec. 10, 2004.

BACKGROUND

A typical enterprise network seems to continuously expand to include an ever increasing number of separate and heterogeneous devices, such as clients, web servers, load balancers, routers, switches, bridges, application servers, storage servers, database servers, and so forth. These different devices may be connected using various types of wired and wireless communications media, arranged in various topologies and sub-networks, and communicate using different protocols. This collection makes communication across all devices a difficult task involving multiple types of connections, communication interfaces, and protocol translation interfaces.

In a reverse process, the heterogeneous devices typically found in an enterprise network are starting to coalesce into a single modular computing platform. For example, server blades are data processing systems or single board computers that plug into slots in a rack, also known as a chassis. The chassis may contain a backplane and/or an interconnect module with buses or communication lines interconnecting the slots in the rack. In addition, a chassis management module (CMM) may be plugged into the rack, for monitoring the resources within the chassis, for providing management warning or alerts, for receiving management directives, and for performing other administrative functions associated with the server blades. The chassis may also contain many other types of components or modules, such as shared power modules, storage blades containing hard disk drives, input/output (I/O) blades for optical or other types of I/O, and so forth. Each server blade within the chassis may implement some or all of the functionality traditionally implemented using separate devices in the enterprise network.

As with enterprise networks, communication across all devices within a modular computing platform may also be a difficult task involving multiple types of connections, communication interfaces, and protocol translation interfaces. Although enterprise networks are attempting to develop common communication schemes, however, data processing systems such as modular computing platforms are still limited to communicating using disparate and proprietary protocols, such as the Intelligent Platform Management Interface (IPMI) protocol and System Management Bus (SMB) protocol, for example. This may limit or complicate internal as well as external communications. This communication challenge may be further exacerbated as modular computing platforms are becoming abstracted into virtual machines (VM) and virtualization technology (VT) systems.

DETAILED DESCRIPTION

Various embodiments may be generally directed to VT systems. More particularly, some embodiments may be directed to a unified messaging scheme that may be implemented for VT systems and their underlying physical devices, such as elements of a data processing system. In one embodiment, for example, a VT system may communicate with various internal logical and physical entities using a predefined and common messaging format. Furthermore, the unified messaging scheme implemented for the VT system may be used to communicate with various external logical and physical entities, such as those found in a typical heterogeneous network such as a standard enterprise network. In this manner, the unified messaging scheme may allow a VT system to perform internal and external communications transparently while reducing or obviating the need for message translations and complex communication interfaces. As a result, a user may be provided with enhanced products or services.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Virtualization Technology System

Figure 1:
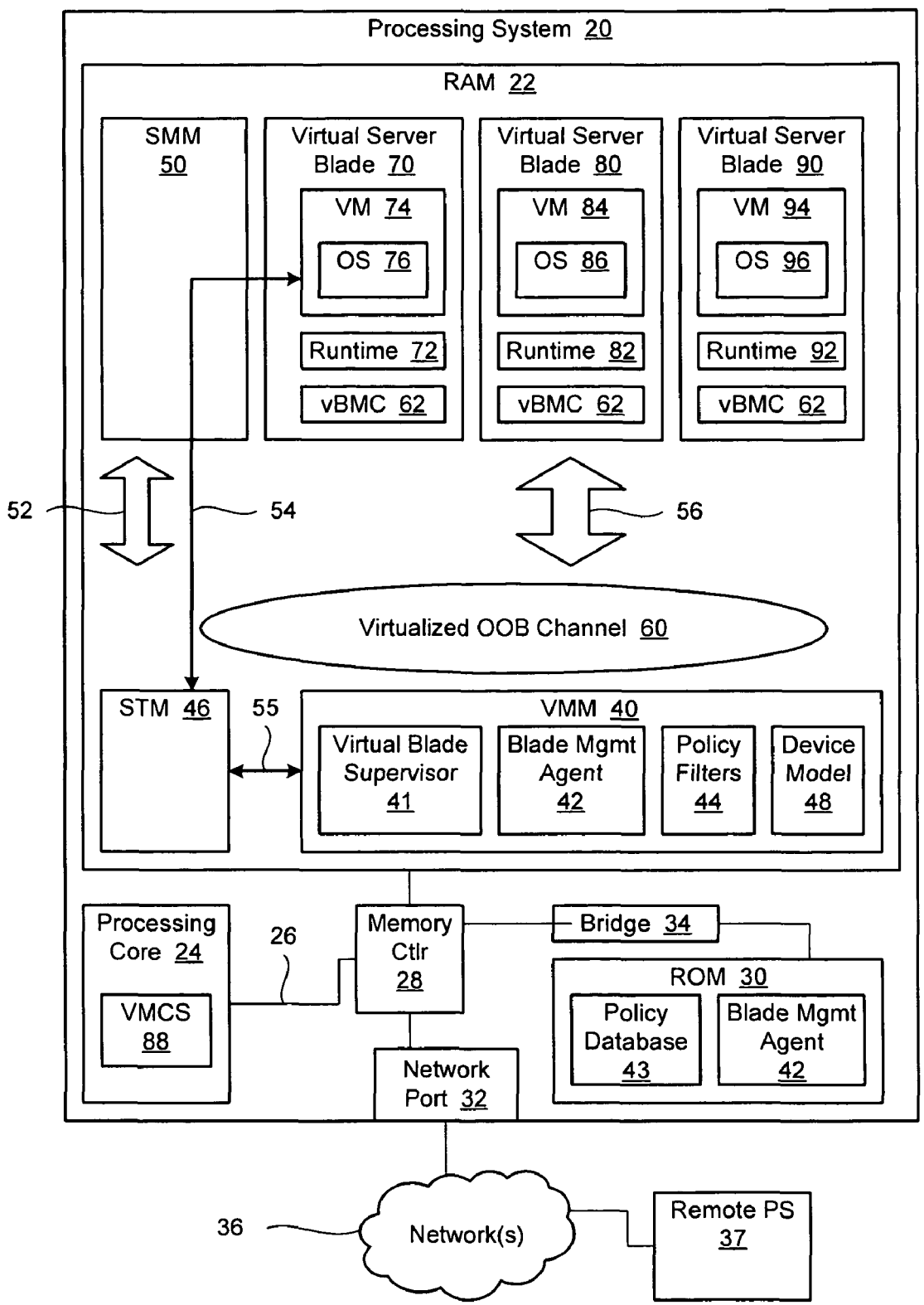
FIG. 1 illustrates one embodiment of a virtualization technology system.

FIG. 1 illustrates one embodiment of a VT system. FIG. 1 illustrates a block diagram of VT system 100. VT system 100 may be implemented using various types of processing systems and virtualization software. For example, VT system 100 may be implemented using various virtualization technologies and techniques, such as defined by the Intel® Virtualization Technology Specification for the IA-32 Intel Architecture, April 2005, and others as well. The embodiments are not limited in this context.

It is worthy to note that FIG. 1 and the following discussion are intended to provide a general description of a suitable environment in which certain aspects of the present embodiments may be implemented. As used herein, the terms "processing system" and "data processing system" are intended to broadly encompass a single machine, or a system of communicatively coupled machines or devices operating together. Exemplary processing systems include, without limitation, modular computer systems, modular computing platforms, distributed computing systems, supercomputers, computing clusters, mainframe computers, mini-computers, client-server systems, personal computers, workstations, servers, portable computers, laptop computers, tablet processing systems, telephones, personal digital assistants (PDAs), hand-held devices, mobile handsets, entertainment devices such as audio and/or video devices, and other devices for processing or transmitting information.

In various embodiments, VT system 100 may be implemented using various Virtualization/Vanderpool techniques. In computing, virtualization is the process of presenting a logical grouping or subset of computing resources so that they can be accessed in ways that give benefits over the original configuration. This new virtual view of the resources is not restricted by the implementation, geographic location or the physical configuration of underlying resources. Commonly virtualized resources include computing power and data storage.

A VT system typically implements multiple VM. In general terms, a VM may comprise software that creates an environment between the computer platform and the end user in which the end user can operate software. Multiple VM may comprise different execution environments on a single computer or data processing system, each of which emulates the host computer or system. This provides each user with the illusion of having an entire private computer isolated from other users running on a single physical machine. The host software which provides this capability is sometimes referred to as a virtual machine monitor (VMM) or Hypervisor, for example.

In various embodiments, VT system 100 may comprise an underlying physical data processing system, such as a modular computing platform, for example. The modular computing platform may have multiple servers implemented as server blades connected to various high availability high speed backplanes, a CMM, and other components, all of which are housed by a blade storage rack or chassis. A server blade may comprise, for example, a single board computer having a processing and memory. VT system 100 may use virtualization software to partition the modular computing platform into multiple virtual machines, with an independent operating system (OS) and independent software applications running in each virtual machine. Examples of virtualization software may include Virtualization Technology software made by Intel Corporation, VMware® Server software made by VMWare, Inc., and others as well. Although some embodiments may be described using a modular computing platform having multiple server blades by way of example, it may be appreciated that any type of data processing system capable of being implemented as a VT system may be used and still fall within the scope of the embodiments. For example, a data processing system with multiple processors, computers, or servers may also be used in lieu of a modular computing system in general, and server blades in particular. The embodiments are not limited in this context.

In various embodiments, VT system 100 may include a processing system 20. Processing system 20 may include one or more processors communicatively coupled to various other components via one or more buses or other communication conduits or pathways. Processing system 20 may use VM technology to provide multiple virtual instances of server blades, to provide a virtual communication channel for those virtual server blades, and to support management of the virtual server blades. This may be accomplished using, for example, a virtual machine monitor (VMM) 40. In some embodiments, the modular computing devices that are emulated by VMM 40 may include processing blade devices and I/O blade devices. The embodiments, however, are not limited in this context.

In various embodiments, processing system 20 may include a processor 24. Processor 24 may be implemented as an integrated circuit (IC) with one or more processing cores. In one embodiment, one or more Intel® Xeon™ processors may be used for processor 24. Processor 24 may support processor virtualization. In other embodiments, other processors may be used, including processors from other manufacturers. The components coupled to processor 24 may include one or more volatile or non-volatile data storage devices, such as random access memory (RAM) 22 and read-only memory (ROM) 30. One or more buses 26 may serve to couple RAM 22 and ROM 30 with processor 24, possibly via one or more intermediate components, such as a memory controller 28, a bus bridge 34, and so forth. For purposes of this disclosure, the term "ROM" refers in general to various types of non-volatile memory devices such as erasable programmable ROM (EPROM), electrically erasable programmable ROM (EEPROM), flash ROM, flash memory, non-volatile RAM (NV-RAM), and so forth.

Processor 24 may also be communicatively coupled to mass storage devices, such as one or more integrated drive electronics (IDE) drives, small computer systems interface (SCSI) drives, or other types of hard disk drives. Other types of mass storage devices and storage media that may be used by processing system 20 may include floppy-disks, optical storage, tapes, memory sticks, digital video disks, biological storage, and so forth.

Additional components may be communicatively coupled to processor 24 in processing system 20, such as video, SCSI, network, universal serial bus (USB), keyboard, and other types of device controllers, input/output (I/O) devices, network ports 32 and other I/O ports, and so forth. Such components may be connected directly or indirectly to processor 24, for example, via one or more buses and bus bridges. In some embodiments, one or more components of processing system 20 may be implemented as embedded devices, using components such as programmable or non-programmable logic devices or arrays, application-specific integrated circuits (ASIC), embedded computers, smart cards, and the like.

Processing system 20 may be controlled, at least in part, by input from conventional input devices, such as a keyboard or keypad, a pointing device, and/or by directives received from one or more remote data processing systems 38, interaction with a virtual reality environment, biometric feedback, or other input sources or signals. Processing system 20 may send output to components such as a display device, remote data processing system 38, and others. Communications with remote data processing system 38 may travel through any suitable communications medium. For example, processing systems 20 and 37 may be interconnected by way of one or more physical or logical networks 36, such as a local area network (LAN), a wide area network (WAN), an intranet, the Internet, a public switched telephone network (PSTN), a cellular telephone network, etc. Communications involving network 36 may utilize various wired and/or wireless short range or long range carriers and protocols, including radio frequency (RF), satellite, microwave, the Institute of Electrical and Electronics Engineers (IEEE) 802.11/802.16/802.20 series of standards or variants, Bluetooth, optical, infrared, cable, laser, and so forth.

Some embodiments may be described by reference to or in conjunction with associated data including instructions, functions, procedures, data structures, application programs, etc. which, when accessed by a machine, result in the machine performing tasks or defining abstract data types or low-level hardware contexts. Such data may be referred to in general as software, and it may be stored in volatile and/or non-volatile data storage.

In one embodiment, for example, one or more storage devices accessible to or residing within processing system 20 (e.g., ROM 30) may include some or all of a software application which, when executed by processor 24, creates and supports one or more virtual server blades within processing system 20. As described below, such a software application may be implemented partially or completely within a VMM 40. For instance, code to implement a virtual blade supervisor 41 and a blade management agent 42 may be loaded from ROM 30 into RAM 22 and executed by processing core 24 to provision and manage virtual server blades 70, 80, and 90. Virtual blade supervisor 41 and blade management agent 42 may be loaded and executed in conjunction with the loading and execution of VMM 40, for example as part of boot operations.

Furthermore, virtual blade supervisor 41 may define and utilize various policy filters 44 to guide the provisioning and management of virtual server blades 70, 80, and 90. Some or all of those policy filters 44 may be based at least in part on entries stored in a policy database 43. For example, policy database 43 may include entries that specify how many virtual server blades are to be created, what type of firmware environment is to be loaded into each virtual server blade, what type of OS is to be loaded into each virtual server blade, how much memory is to be made available to each blade, which network channels or other I/O channels are to be made available to each blade, how much bandwidth of a given I/O channel is to be made available to each blade, how much disk storage is to be made available to each blade, how much compute time or what portion of aggregate compute time is to be made available to each blade, etc. As described in greater detail below, virtual blade supervisor 41 may provision and manage virtual server blades 70, 80, and 90 according to the policies stored in policy database 43.

In one embodiment, virtual blade supervisor 41 provisions or creates virtual server blades 70, 80, and 90, and virtual blade supervisor 41 provides each virtual server blade with its own independent firmware environment 72, 82, and 92, respectively. For purposes of this disclosure, virtual server blades may also be referred to as emulated server blades, and firmware environments may also be referred to as runtime environments. Within each emulated server blade, the runtime environment may provide low level services such as the services typically provided by a basic input/output system (BIOS) in a conventional data processing system.

Virtual blade supervisor 41 may provide one or more virtual server blades with different runtime environments. For example, in virtual server blade 70, runtime environment 72 may provide interfaces to hardware and other services in accordance with a modular firmware architecture that complies with the Extensible Firmware Interface (EFI) Specification Version 1.10, update 001, Nov. 26, 2003. Runtime environment 72 may therefore also be referred to as an EFI runtime. Runtime environment 92 may also be an EFI runtime. Runtime environment 82 may be a legacy runtime, such as the firmware environment provided by a relatively monolithic BIOS.

In various embodiments, VMM 40 provides each of virtual server blades 70, 80, and 90 with its own respective virtual machine (VM) 74, 84, or 94. Each VM may include its own independent OS, and the OS can vary from VM to VM. For example, OS 76 in virtual server blade 70 may be a WINDOWS® Server OS, OS 86 in virtual server blade 80 may be a SOLARIS® OS, and OS 96 in virtual server blade 90 may be a LINUX OS. In alternative embodiments, other types of runtime environments and OS may be used.

As indicated by block arrow 56, VMM 40 may provide processor, platform, and blade rack virtualization for virtual server blades 70, 80, and 90. For example, VMM 40 may provide each virtual server blade with the illusion that the runtime environment and the OS in that virtual server blade are the only runtime environment and OS running in processing system 20. Each virtual server blade may therefore operate as an independent entity. The way VMM 40 interacts with each virtual server blade may establish such independence. For example, VMM 40 may provision and manage memory and I/O usage for each virtual blade in a way that maintains the independence of each virtual blade. VMM 40 may thus allows the OS and runtime environment in each virtual server blade to operate as if that OS and runtime environment were the only OS and runtime environment running in processing system 20. VMM 40 may also protect and isolate each virtual server blade from the other virtual server blades. For example, a software virus in one virtual server blade may be limited to that virtual server blade, so the virus would not affect the operation of the other virtual server blades.

One of the techniques that processing system 20 may use to create and manage virtual server blades is a mode of operation known as system management mode (SMM) 50. Processing system 20 may automatically enter SMM 50 in response to a system management interrupt (SMI). The current system state may be automatically saved when SMM 50 is entered, and automatically restored when SMM 50 is exited. When in SMM 50, processing system 20 may perform operations independently of any OS in processing system 20. The hardware and software support for SMM 50 may be included in processing system 20 when the customer receives processing system 20 from the manufacturer or vendor. SMM 50 may therefore be referred to sometimes as an original equipment manufacturer (OEM) SMM.

In one embodiment, VMM 40 uses a hardware data structure known as a virtual machine configuration structure (VMCS) 88 within processor 24 to manage the state of each virtual blade. VMCS 88 may share some similarities with a conventional task state segment (TSS). For instance, processor 24 may decode VMCS 88. In one embodiment, VMM 40 uses VMCS 88 to manage the I/O and memory resources for each virtual blade.

VMM 40 may use a software entity known as a virtual translation lookaside buffer (TLB) to provide another layer of memory mapping, from the mapping of guest VM 74, 84, and 94. For instance, the virtual TLB may use page tables to map memory references received from virtual server blades 70, 80, and 90 into corresponding physical addresses in RAM 22.

VMM 40 may also include various device models that emulate controllers and devices. For instance, VMM 40 may include a device model for emulating a programmable interrupt controller (PIC), an advanced programmable interrupt controller (APIC), an I/O APIC, and so forth. In another example, VMM 40 may include another device model for emulating an IDE controller. In yet another example, VMM 40 may include yet another device model for emulating a network controller. Emulated devices and controllers based on device models may also be referred to as virtual controllers and devices. VMM 40 may use device models to provide virtual controllers and devices which allocate resources and govern resource usage for each virtual blade, in accordance with the policy settings.

In one embodiment, VMM 40 may use a baseboard management controller (BMC) device model 48 to provide an emulated BMC 62 for each virtual blade. An emulated BMC may also be referred to as a virtual BMC or vBMC. Each virtual BMC 62 may provide the functionality that a conventional BMC may provide for a physical server blade. For instance, virtual BMCs 62 may log event and error data, and virtual BMCs 62 may report status data to software within processing system 20 and/or to external management software. The status data from a particular virtual BMC may include information such as error reports and current operational status for the emulated server blade associated with that virtual BMC.

In one embodiment, the virtual BMC 62 for each virtual server blade may trap the I/O ports of a keyboard controller style (KCS) interface of that virtual server blade, and redirect the I/O to the BMC device model 48 in VMM 40. In the example embodiment, BMC device model 48 represents a class of software in VMM 40 that maps VM-visible I/O operations into veritable hardware operations. In addition, BMC device model 48 may materialize a virtual BMC 62 for each VM 70, 80, and 90. BMC device model 48 may also either communicate with a physical BMC within processing system 20, or effect BMC-like behavior in some other fashion.

Communication Channels for VT System

VMM 40 may also provide one or more virtual in-band or out-of-band channels 60 for communications to, from, and between virtual server blades 70, 80, and 90. As used herein, an out-of-band (OOB) channel is a communication channel that operates under the supervision of hardware and/or software components residing logically below the OS level. Accordingly, a processing system may utilize an OOB channel even if the processing system lacks a functional OS. From the perspectives of the software in each virtual blade server and of blade management software outside the virtual blades, such virtual OOB channels may be indistinguishable from the OOB channels provided in server blade racks for conventional server blades.

VMM 40 may use the OOB channels to communicate various types of information. More particularly, VMM 40 may use the OOB channels to implement a unified messaging format that may be used standardize communications across VT system 100 and its underlying data processing system (e.g., a modular computing platform). An example of a unified messaging format may include an existing messaging format as defined by the Simple Object Access Protocol (SOAP) Specification, Version 1.2, Jun. 24, 2003, including working drafts, recommendations and variants, which are currently maintained by the Extensible Markup Language (XML) Protocol Working Group of the World Wide Web (W3) Consortium (collectively referred to herein as the "SOAP Specification").

The SOAP Specification attempts to provide standardize communications between disparate objects. For example, SOAP Version 1.2 provides the definition of the XML-based information which can be used for exchanging structured and typed information between peers in a decentralized, distributed environment. A SOAP message is formally specified as an XML Infoset, which provides an abstract description of its contents. Infosets can have different on-the-wire representations, one common example of which is as an XML 1.0 document.

The SOAP Specification may use one or more XML formats. One example of a XML format suitable for use with the SOAP Specification includes the Web Services Description Language (WSDL), Version 2.0, January 2006, including working drafts, recommendations and variants, which are currently maintained by the XML Protocol Working Group of the W3 Consortium (collectively referred to herein as the "WSDL Specification"). The WSDL Specification defines an XML language for describing Web services.

In various embodiments, VT system 100 may use one or more application program interfaces (API) for use in communicating messages. In one embodiment, for example, a publisher API skeleton suitable for use between a VM, a VMM/Hypervisor, and/or a CMM to build a WSDL for SOAP messages may be illustrated using the following pseudocode:

```
Struct Pub*CreatePub(PubInfo* pubInfo){...}
Int DestroyPub(struct Pub* p){...}
Int SendEvent_XXX(Struct Pub* p,
    Struct EventXXX* e){
    Return SendEvent(p, e);}
Int SendEvent(Struct Pub* p, void* e){
    Struct Sub* s, int count = 0;
    While((s = GetSub(count++))){
        SoapMsg m = BuildEnvelope( );
        SerializeEvent(m, p, e);
        EnqueEvent(s, m);}
    Return count;}
```

In general, the SOAP Specification defines a fundamentally stateless, one-way message exchange paradigm. Applications can create, however, more complex interaction patterns (e.g., request/response, request/multiple responses, etc.) by combining such one-way exchanges with features provided by an underlying protocol and/or application-specific information. The SOAP Specification is silent on the semantics of any application-specific data it conveys, as it is on issues such as the routing of SOAP messages, reliable data transfer, firewall traversal, and so forth. The SOAP Specification provides, however, the framework by which application-specific information may be conveyed in an extensible manner. Also, the SOAP Specification provides a full description of the required actions taken by a SOAP node on receiving a SOAP message.

A SOAP message is typically contained in an envelope. Within this envelope are two additional sections, which include the header and the body of the message. SOAP messages use XML namespaces. The header contains relevant information about the message. For example, a header can contain the date the message is sent, or authentication information. It is not required, but, if present, must always be included at the top of the envelope. A generic example of a WSDL/SOAP message may be shown as follows:

```
<s: Envelope xmlns:s=...>
<s: Header>
<a: To>http://schemas.xmlsoap.org/ws/2004/08/addressing/role/anonymous</a:To>
<a: Action>http://schemas.xmlsoap.org/.../eventing/SubscribeResponse</a: Action>
<a: MessageID>uuid:b006cb5a-79c4-4d01-a290-000000000002</a: MessageID>
<a: RelatesTo>uuid:b006cb5a-79c4-4d01-a290-000000000001</a: RelatesTo>
<!- EPR properties and parameters and other headers->
<s:Header><s: Body>
<!-body content->
</s:Body></s:Envelope>
```

A specific example of a WSDL/SOAP message to handle various VT system 100 management operations may be shown as follows:

```
<s: Envelope x:http://smaple.org/test...>
    <s: Header>
        <x: Verbose>yes<
        </x: Verbose>
        <x: PowerOff>PT60S</x: PowerOff>
        <x: UseCache>no<
        </x: UseCache>
    </s: Header>
    <s: Body>...</s: Body>
</s: Envelope>
```

Using a SOAP and/or WSDL message architecture for VT system 100 may allow each VM or server blade to communicate as if it were a logical network. As a result, VMM 40 and virtual server blades 70, 80, and 90 may communicate in accordance with the SOAP Specification and the WSDL Specification. In this manner, VT system 100 may seamlessly communicate information to internal and external entities across logical and physical boundaries.

In addition to using I/O emulation and device models to emulate devices for blade VMs, VMM 40 may provide processing system 20 with blade VMs which know that they are being virtualized. Such virtual machines may be referred to as enlightened guests, or as para-virtualized machines. Instead of accessing an I/O port which is trapped and/or emulated in VMM 40, a virtual blade using a para-virtualized machine may make a synchronous call into VMM 40 through an instruction such as the IA32 virtual machine call (VMCALL) instruction.

Portions of VMM 40, such as blade management agent 42, may also provide robust capabilities for monitoring and managing virtual server blades 70, 80, and 90. For instance, blade management agent 42 may provide some or all of the functionality that would be provided by a conventional CMM in a rack with physical server blades, such as an external interface for communication with external devices; internal interfaces for communication with virtual server blades 70, 80, and 90; support for mirroring of virtual blades; support for automatic failover between virtual blades in response to errors such as soft errors; and so forth. In some embodiments, these and other types of managerial or administrative functions may be performed primarily by blade management agent 42 or other software within VMM 40, based on policies represented by policy definitions stored in policy filters 44. As used herein, software that provides some or all of the functionality that a conventional CMM provides may be referred to as a virtual CMM. In one embodiment, blade management agent 42 may comprise a virtual CMM.

In some embodiments, portions of VMM 40 such as virtual blade supervisor 41 and/or blade management agent 42 may serve as an interface to virtual server blades 70, 80, and 90 for conventional software for managing physical blades, such as the client/server workgroup management software distributed by IBM Corporation under the name IBM Director™. Processing system 20 may thus leverage the software, system, and network infrastructure developed by the industry to support physical blades, for use in the context of a single physical platform that uses hardware virtualization to emulate multiple server blades. A data center administrator may therefore view the single physical platform of processing system 20 as a pool of physically-isolated, independently manageable server blades. Accordingly, VMM 40 may allow virtual server blades 70, 80, and 90 to be individually repurposed, leased, and/or used by different tenants.

In various embodiments, the functionalities referenced above may be supported by VMM 40 and managed by blade management agent 42 within VMM 40, by blade management software running within processing system 20, or by blade management software running on an external system such as remote processing system 37. In other embodiments, the management functionality may be distributed among blade management agent 42 and internal or external blade management software.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a connection management module, or any combination thereof. The embodiments are not limited in this context.

Figure 2:
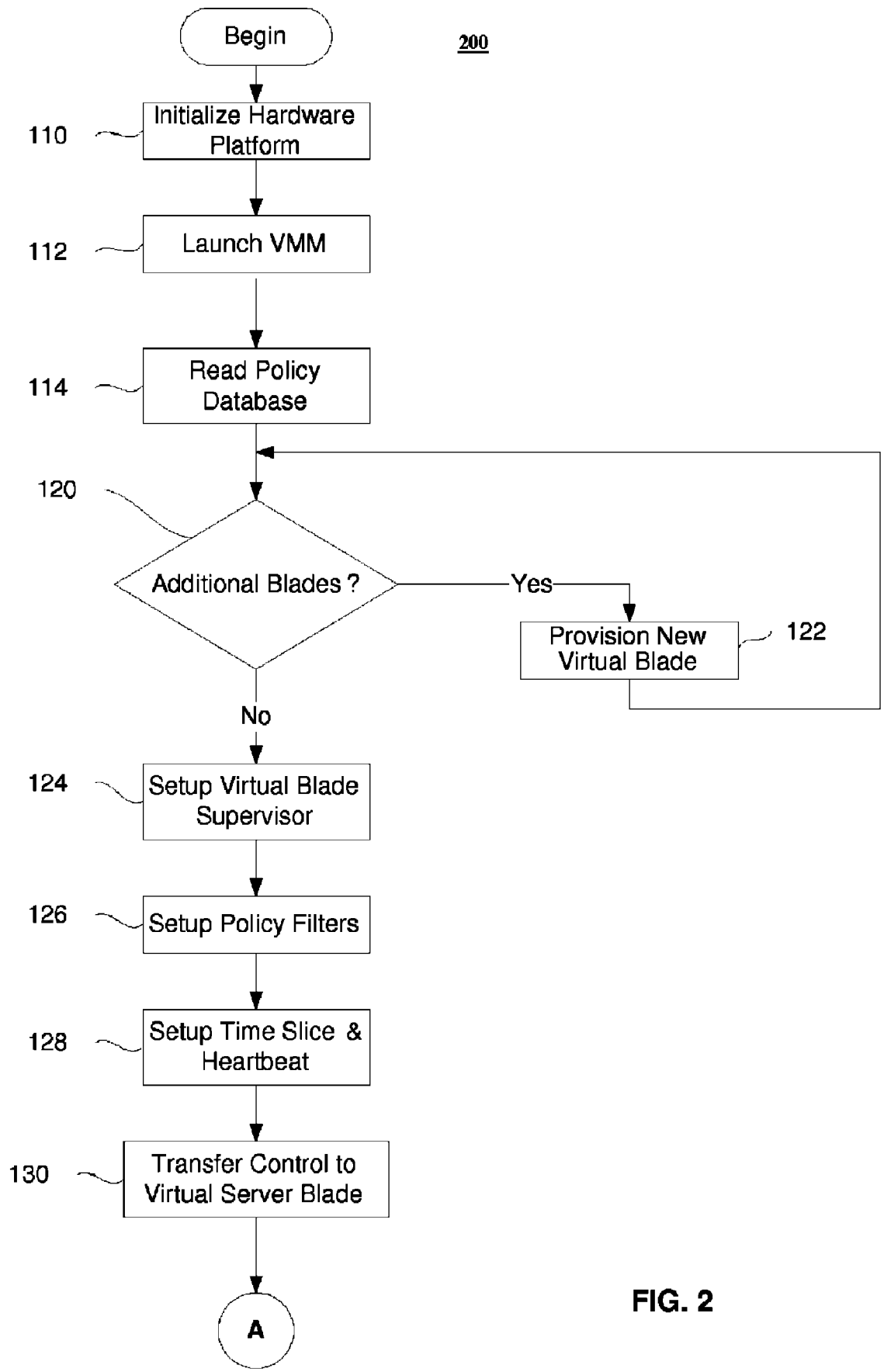
FIG. 2 illustrates one embodiment of a first logic diagram.

FIG. 2 illustrates one embodiment of a first logic flow. FIG. 2 illustrates a first logic flow 200. Logic flow 200 may provide an example of a process for providing virtual server blades. Logic flow 200 may begin with processing system 20 initiating a boot sequence, for instance in response to a power on or reset event. At block 110, some or all of the hardware in processing system 20 may be initialized. For instance, various components may be initialized, such as processor 24, RAM 22, a chipset, an I/O controller, and so forth. At block 120, VMM 40 may be obtained from a local or remote data store, loaded into RAM 22, and launched. At block 114, VMM 40 may read policy database 43 to obtain configuration parameters for provisioning and managing virtual server blades. In other embodiments, VMM 40 may obtain the configuration parameters from a remote source, such as a remote management console. VMM 40 may then provision any virtual server blade instances called for by the configuration parameters, as indicated at blocks 120 and 122. For example, virtual blade supervisor 41 may instantiate and configure virtual server blades 70, 80, and 90 in accordance with data from policy database 43.

Once the initial set of virtual server blades has been instantiated, VMM 40 may launch virtual blade supervisor 41, as indicated at block 124. As depicted at block 126, virtual blade supervisor 41 may set up policy filters 44 to be used in managing virtual server blades 70, 80, and 90, based at least in part on the configuration parameters from policy database 43. Policy filter 44 may control such things as failover parameters; packet handling instructions; error handling instructions; which attributes of virtual blades 70, 80, and 90 will be made visible to server management software; heartbeat and time slice durations; and so forth. In one embodiment, the policy parameters in policy filter 44 correspond to the policies that a CMM would implement or enforce in a system with physical server blades.

As indicated at block 128, virtual blade supervisor 41 may then establish one or more time periods to limit the amount of time that each virtual server blade runs before control is passed to another virtual server blade. Such a predetermined time period may also be referred to as a time slice. In addition, virtual blade supervisor 41 may establish a shorter time period to limit the amount of time that any virtual server blade runs before control is passed back to VMM 40. That time period may be referred to as a heartbeat.

Once virtual blade supervisor 41 establishes the time slices and heartbeats, VMM 40 may then pass control to one of the virtual blades, as indicated at block 130. The process may then pass through page connector A to block 210.

Control may return to VMM 40 upon an exit from any of the virtual blades caused by expiration of a time slice or heartbeat. Certain types of input, such as incoming network packets, may also cause control to return to VMM 40. When VMM 40 gets control, it may perform tasks such as house keeping operations, and may then pass control to a successive virtual blade. In one embodiment, for example, VMM 40 typically consumes less than ten percent of the total compute time, and virtual blades 70, 80, and 90 get most of the compute time.

Referring again to FIG. 1, another technique that processing system 20 may use to support virtual server blades 70, 80, and 90 is a software element known as an SMI transfer monitor (STM) 46. In the example embodiment, STM 46 is a parallel, peer monitor to VMM 40, and STM 46 is responsible for guest-hosting the SMM code in its own VM as indicated at SMM 50. The same organization may develop STM 46 and VMM 40, or they may be developed by different entities.

STM 46 may create an STM-SMM interface 52 in processing system 20. When SMM 50 wants to access a resource that is not virtualized, such as a physical memory address in a secure system with curtained memory, STM 46 may use STM-SMM interface 52 to request that STM 46 performs the access. For example, SMM 50 may use STM-SMM interface 52 for functions like soft error correction code (ECC) scrubbing. In one embodiment, exit events from SMM 50 go into STM 46. Any suitable memory and messaging interfaces may be used between STM 46 and VMM 40.

As shown in FIG. 1, line 54 represents an application program interface (API) between the OEM SMM code and STM 46 and/or VMM 40. This API allows isolation of CMM-specific data and other virtualization information from OEM code. This interface allows a business deployment where the OEM SMM code and the STM code can have different authors, for instance. Line 54 can connect to any of virtual machines 74, 84, and 94, as each guest can be exited via an SMI activation.

As further shown in FIG. 1, line 55 represents an interface to abstract the peer monitor (STM 46) from the main monitor (VMM 40). This abstraction allows a similarly split deployment model where the author of STM 46 could differ from the author of VMM 40.

Figure 3:
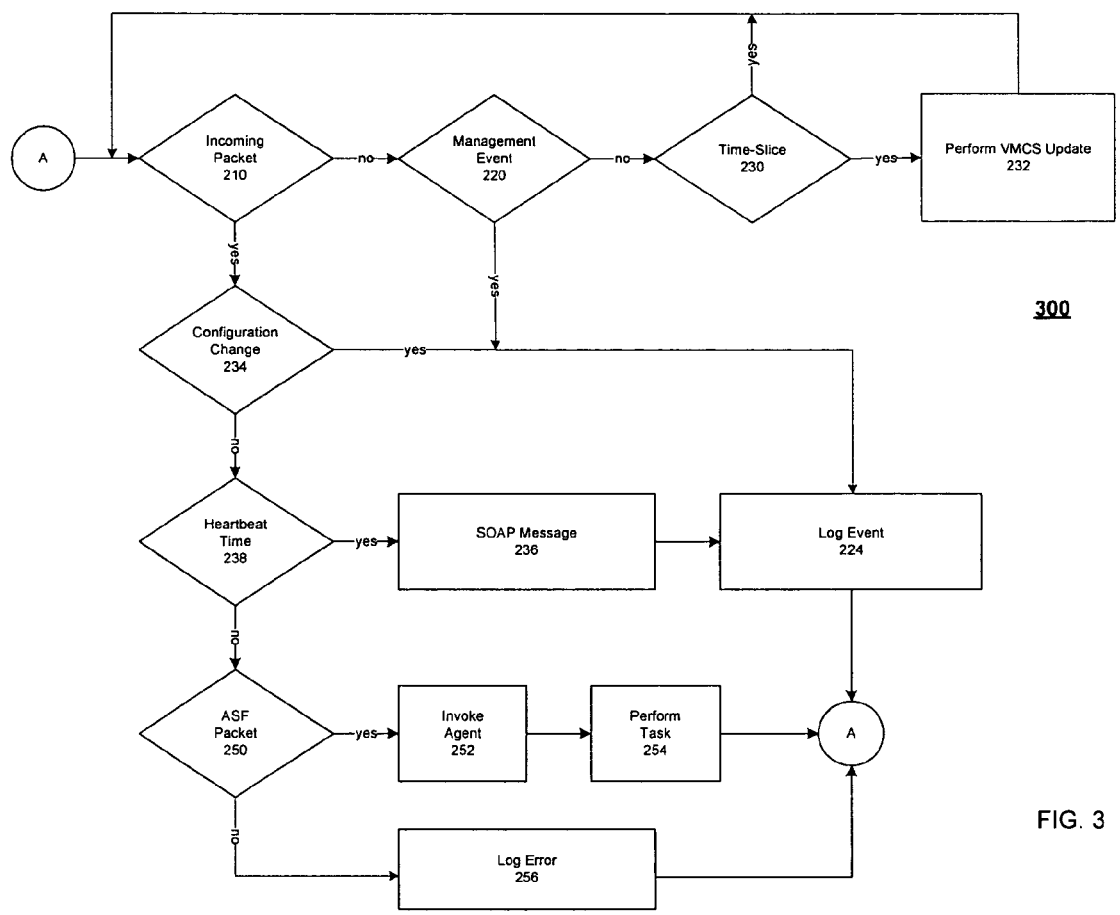
FIG. 3 illustrates one embodiment of a second logic diagram.

FIG. 3 illustrates one embodiment of a second logic flow. FIG. 3 illustrates logic flow 300. Logic flow 300 may demonstrate management operations for virtual server blades and unified management communications between virtual server blades and VMM 40.

Virtual blade supervisor 41 may determine whether processing system 20 has received an incoming network packet at block 210. If a network packet has not been received at block 210, virtual blade supervisor 41 may determine whether any management events have occurred as indicated at block 220. If there is a management event indicated at block 220, the management event may be handled by processing system 20. Examples of management events may include monitoring virtual server blades 70, 80 and 90, providing management warning or alerts, providing management directives or commands, performing various administrative functions associated with the server blades, performing error detection and containment for the server blades, and so forth.

In one embodiment, for example, a management event may include detecting whether one of virtual server blades 70, 80, and 90 has experienced an error. For example, if there is a memory error in the physical memory array, processing system 20 may map the BERR# (bit error rate) or BINIT# (bus initialize) signal to a system management interrupt number (SMI#). In response to the SMI, if the memory error resides in a portion of memory associated with a virtual server blade, SMM 50 may attempt to communicate, via the KCS interface, with the virtual BMC 62 of that virtual server blade. This communication may involve a virtual machine exit (VMEXIT) from the guest-hosted SMM 50 into STM 46. Thus, SMM 50 may perform error containment for the error. In another example, in the event of an error contained within a given VM, such as a double ECC failure in a physical memory page, VMM 40 can either map a different physical page to that VM if the contents of memory are recoverable, or terminate the VM and permanently mark the failed memory region as unusable. The types of errors that virtual BMC 62 may handle include, without limitation, single- and double-bit memory errors, overheating, and so forth.

Once the management event has been detected and handled, processing system 20 may then log the error, as indicated at block 224. For example, when a memory error occurs as described above, virtual BMC 62 may log the memory page and the event of failure. To log the error, STM 46 may send a message to VMM 40 that there is an error log to be posted by a virtual BMC 62. This message may be passed, for instance, via a mailbox or other predetermined region in a portion of memory that is shared by VMM 40 and STM 46. BMC device model 48 in VMM 40 may then store the error information, for example to a portion of the hard-disk reserved by VMM 40 for storing virtual blade error conditions.

If there is no management event detected at block 220, virtual blade supervisor 41 may determine whether the time slice for a current virtual server blade has expired, as indicated at block 230. If the time slice for the current blade has expired, virtual blade supervisor 41 may swap control from the current virtual server blade to the next virtual server blade, as indicated at block 232. For instance, virtual blade supervisor 41 may perform an update of a pointer in VMCS 88 from a current virtual blade state in VMCS 88 to a successor virtual blade state in VMCS 88. Such a VMCS update may cause VMCS 88 to point to the memory and I/O state of the VM for the desired successor virtual blade. Performing such an update may be similar to updating an IA32 TSS in preparation for performing a task switch. After the VMCS update, VMM 40 may perform a virtual machine enter (VMEnter) command to pass control to the VM of that successor virtual blade. At the next heartbeat after either swapping in the desired virtual blade server or determining that the time slice has not expired, the process may return again to block 210, with virtual blade supervisor 41 determining whether processing system 20 has received a network packet.

Referring again to block 210, if processing system 20 receives a network packet, virtual blade supervisor 41 may determine whether the packet contains data pertaining to a configuration change event for virtual server blades 70, 80 and 90 at block 234. If there is a configuration change event at block 234, the current virtual server blade may send a SOAP message to VMM 40 at block 236. Processing system 20 may log the configuration change event at block 224, and pass control back to block 210 to wait for the next incoming network packet.

If there is no configuration change event detected at block 234, virtual blade supervisor 41 may determine whether the packet contains data pertaining to a heartbeat time at block 238. If there is a heartbeat time at block 238, the current virtual server blade may send a SOAP message to VMM 40 at block 236. Processing system 20 may log the heartbeat time at block 224, and pass control back to block 210 to wait for the next incoming network packet.

If there is no heartbeat time at block 238, however, blade management agent 42 may determine at block 250 whether the packet contains data pertaining to remote system management. For instance, virtual blade supervisor 41 may determine whether the packet comports with a specification for remote control and alerting interfaces, such as the Alert Standard Format (ASF) Specification, Version 2.0, Apr. 23, 2003. For purposes of this disclosure, packets containing data for remote system management may be referred to in general as ASF packets. In one embodiment, remote system 37 may use an application such as IBM DIRECTOR to send packets with data for remote system management to processing system 20. If the received packet is not an ASF packet, virtual blade supervisor 41 may log an error indicating that the packet could not be processed, as indicated at block 256.

If the packet is an ASF packet, virtual blade supervisor may invoke blade management agent 42, as indicated at block 252. Conventionally, ASF functionality is typically provided by a network interface card (NIC). VMM 40 may use a network device model to emulate the NIC and provide ASF packet processing. For instance, blade management agent 42 may process the packet and perform any operations called for by the packet, as indicated at block 254. For example, the packet may cause blade management agent 42 to repurpose and/or reconfigure one or more virtual server blades. For instance, blade management agent 42 may allow remote system 37 to obtain configuration and error data from one or more virtual server blades; to add or remove one or more virtual server blades; to change the amount of memory, disk space, and/or I/O bandwidth available to one or more virtual server blades; to reallocate processing workload among virtual server blades 70, 80, and 90; modify one or more power levels for virtual server blades 70, 80, and 90, and so forth. Blade management agent 42 may perform such operations via virtual BMCs 62 of the relevant virtual server blades.

After blade management agent 42 has performed the operations called for by the packet, or after an error has been logged for a non-ASF packet at block 256, the flow may return to block 210. Processing system 20 may then continue to support and manage the virtual server blades, repeating the above operations, as appropriate. The technology described herein may thus provide a seamless manageability infrastructure underneath virtual server blades 70, 80, and 90.

In various embodiments, a separate physical network port or media access control (MAC) address may be assigned or directly mapped to each virtual server blade that is to have networking capabilities at the OS or application level. In alternative embodiments, however, VMM 40 may use a single port (e.g., network port 32) to emulate multiple independent ports for multiple virtual sever blades. Such an embodiment may use a flow similar to those summarized in FIG. 2 and/or FIG. 3. The system may also determine, however, whether an incoming packet is destined for an OS or application in one of the virtual blades and then forward the packet accordingly.

Hardware capabilities are expected to increase in the future. For instance, the number of cores on a processor may be increased. The teachings of the present disclosure may be used to retrofit conventional server management infrastructure, for the purpose of managing the enhanced capabilities provided by future processing system. The teachings of the present disclosure may also be used for provisioning and managing grid computing technologies, for example to provide for software based demand computing.

Using techniques and components such as those described herein, software based blades such as virtual server blades 70, 80, and 90 may be used for teaming and failover design, and can achieve high reliability, availability, and scalability (RAS). For instance, blade management agent 42 and virtual blade supervisor 41 may automatically modify operational parameters of emulated server blades, in response to data received from the emulated BMC. For example, if data from an emulated BMC indicates that an application in the corresponding virtual blade has malfunctioned or become hung up, blade management agent 42 and virtual blade supervisor 41 may automatically replace the malfunctioning virtual blade with a different virtual blade. The replacement virtual blade made be an existing virtual blade, or processing system 20 may automatically provision a new virtual blade for use as the failover blade. Blade management agent 42 and virtual blade supervisor 41 may perform such operations based at least in part on predetermined policies for blade management stored in a database of blade management policies, such as policy filters 44 and/or policy database 43.

Blade management agent 42 and/or virtual blade supervisor 41 may automatically make other kinds of modifications to the operational parameters of emulated server blades 70, 80, and 90 in response to other types of conditions. For example, VMM 40 may provide for automatic load balancing and other types of automatic adjustments in response to other kinds of conditions detected by virtual BMCs 62, and VMM 40 may allow manual or automatic adjustments to be made from local or remote blade management software packages. For example, VMM 40 may accomplish the equivalent of a hot add of memory by shifting memory allocation to one VM to from another, and the equivalent of a hot add of disk space by shifting virtual disk to one VM from another. Similar adjustments can be made with regard to network band-width, etc.

The technology described herein may be used in cooperation with existing technology to provide fail-safe mechanisms via software. For instance, enterprise blade capabilities may be provided in a single box. Customers with large investments in conventional server blade infrastructure can use that infrastructure to manage the VMM-based virtual blades described herein. A processing system with virtual server blades may provide higher processing performance (e.g., millions of instructions per second) per unit of energy (e.g., Watt) and space consumed (e.g., cubic centimeters), relative to other types of systems.

In one embodiment, processing system 20 provides a logical view of virtual server blades so that different tenants can enjoy strong isolation properties and accrue advantages of the blade manageability infrastructure. The users may therefore enjoy reduced product bill of material (BOM) costs, relative to a processing system with a blade chassis and physical server blades, while still enjoying many of the benefits of blade architecture based servers. For instance, the BOM for a processing system with physical server blades may include redundant server management hardware, cooling components, etc.

In some embodiments, the support for hardware virtualization may be provided by the processor or platform developer. With such embodiments, customers may deploy virtual server blades without the need for any virtualization software from third party software developers.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal connection management modules (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, connection management module, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a first server blade emulated using a first virtual machine in a processing system;
a second server blade emulated using a second virtual machine; and
a virtual machine monitor to communicate information with said emulated server blades using one or more of the out of band channels to implement a simple object access protocol message, wherein the virtual machine monitor comprises a policy filter to manage switching to a different emulated server blade based on one or more heartbeat and time slice duration.

2. The apparatus of claim 1, comprising a chassis management module emulated using a third virtual machine to manage said emulated server blades.

3. The apparatus of claim 1, one of said emulated server blades to receive a configuration change message, and send a simple object access protocol message to said virtual machine monitor indicating said configuration change.

4. The apparatus of claim 1, one of said emulated server blades to receive the heartbeat message by an emulated server, and send a simple object access protocol message to said virtual machine monitor indicating a time to switch to a different emulated server blade.

5. The apparatus of claim 1, comprising a virtual blade supervisor to provision and manage said emulated server blades in accordance with the policy filter.

6. A system, comprising:
a backplane;
a first server blade to couple to said backplane, said first server blade emulated using a first virtual machine in a processing system;
a second server blade to couple to said backplane, said second server blade emulated using a second virtual machine; and
a virtual machine monitor to communicate information with said emulated server blades using one or more of the out of band channels to implement a simple object access protocol message, wherein the virtual machine monitor comprises a policy filter to manage switching to a different emulated server blade based on one or more heartbeat and time slice duration.

7. The system of claim 6, comprising a chassis to couple to said backplane and said server blades.

8. The system of claim 6, comprising a chassis management module emulated using a third virtual machine to manage said emulated server blades.

9. The system of claim 6, one of said emulated server blades to receive a configuration change message, and send a simple object access protocol message to said virtual machine monitor indicating said configuration change.

10. The system of claim 6, one of said emulated server blades to receive the heartbeat message by an emulated server, and send a simple object access protocol message to said virtual machine monitor indicating a time to switch to a different emulated server blade.

11. A method comprising:
   emulating a first server blade using a first virtual machine in a processing system;
   emulating a second server blade using a second virtual machine; and
   communicating information between a virtual machine monitor and said emulated server blades using one or more of the out of band channels to implement a simple object access protocol message, wherein the virtual machine monitor comprises a policy filter to manage switching to a different emulated server blade based on one or more heartbeat and time slice duration.

12. The method of claim 11, comprising communicating information between said emulated server blades using a simple object access protocol message.

13. The method of claim 11, comprising emulating a chassis management module using said virtual machine monitor to manage said emulated server blades.

14. The method of claim 11, comprising:
   receiving a configuration change message by an emulated server blade; and
   sending a simple object access protocol message to said virtual machine monitor indicating said configuration change.

15. The method of claim 11, comprising:
   receiving the heartbeat message by an emulated server blade; and
   sending a simple object access protocol message to said virtual machine monitor indicating time to switch to a different emulated server blade.

16. An article comprising a machine-readable storage medium containing instructions that if executed enable a system to emulate a first server blade using a first virtual machine, emulate a second server blade using a second virtual machine, and communicate information between a virtual machine monitor and said emulated server blades using one or more of the out of band channels to implement a simple object access protocol message, wherein the virtual machine monitor comprises a policy filter to manage switching to a different emulated server blade based on one or more heartbeat and time slice duration.

17. The article of claim 16, further comprising instructions that if executed enable the system to communicate information between said emulated server blades using a simple object access protocol message.

18. The article of claim 16, further comprising instructions that if executed enable the system to emulate a chassis management module using said virtual machine monitor to manage said emulated server blades.

19. The article of claim 16, further comprising instructions that if executed enable the system to receive a configuration change message by an emulated server blade, and send a simple object access protocol message to said virtual machine monitor indicating said configuration change.

20. The article of claim 16, further comprising instructions that if executed enable the system to receive the heartbeat message by an emulated server blade, and send a simple object access protocol message to said virtual machine monitor indicating time to switch to a different emulated server blade.

* * * * *